United States Patent [19]

Majkrzak

[11] Patent Number: 5,359,835
[45] Date of Patent: Nov. 1, 1994

[54] UNDERWATER WEED ROLLER

[75] Inventor: David S. Majkrzak, West Fargo, N. Dak.

[73] Assignee: Crary Company, West Fargo, N. Dak.

[21] Appl. No.: 998,139

[22] Filed: Dec. 28, 1992

[51] Int. Cl.⁵ .................. A01B 29/00; A01G 1/12
[52] U.S. Cl. ........................................ 56/8; 404/122
[58] Field of Search .............. 56/8, 9; 404/122

[56] References Cited

U.S. PATENT DOCUMENTS

| | | | |
|---|---|---|---|
| 1,182,961 | 5/1916 | Beardall | 172/24 |
| 2,711,615 | 6/1955 | Boice, Jr. | 47/1 |
| 2,902,099 | 9/1959 | Yafjack | 172/28 |
| 3,133,395 | 5/1964 | Farmer | 56/8 |
| 3,546,857 | 12/1970 | Henning | 56/8 |
| 3,706,185 | 12/1972 | Chaplin | 56/9 |
| 3,866,396 | 2/1975 | Meyer | 56/9 |
| 4,216,838 | 8/1980 | Degraeve et al. | 180/14 |
| 4,259,828 | 4/1981 | Pace | 56/9 |
| 4,520,616 | 6/1985 | Stewart et al. | 56/9 |
| 4,638,621 | 1/1987 | Stewart, III et al. | 56/9 |
| 4,999,982 | 3/1991 | Kriger | 56/8 |
| 5,074,105 | 12/1991 | Roth | 56/8 |

FOREIGN PATENT DOCUMENTS 2602218  8/1977  Germany ................ 56/9

Primary Examiner—Ramon S. Britts
Assistant Examiner—James A. Lisehora
Attorney, Agent, or Firm—Westman, Champlin & Kelly

[57] ABSTRACT

A weed remover for removing weeds and preventing the growth of new weeds on the bed of a body of water. The weed remover comprises a housing a motor, a drive chain, and a roller having a plurality of fins attached thereto. The motor drives the drive chain which in turn rotates the roller. When the roller is rotated, the fins dig into the bed of the body of water, causing the roller to roll along the bed. The housing is attached to a dock such that it can rotate about a generally vertical axis, permitting the roller to roll in an arc. The direction of rotation of the roller can be reversed such that the roller reciprocates over substantially the same path.

15 Claims, 6 Drawing Sheets

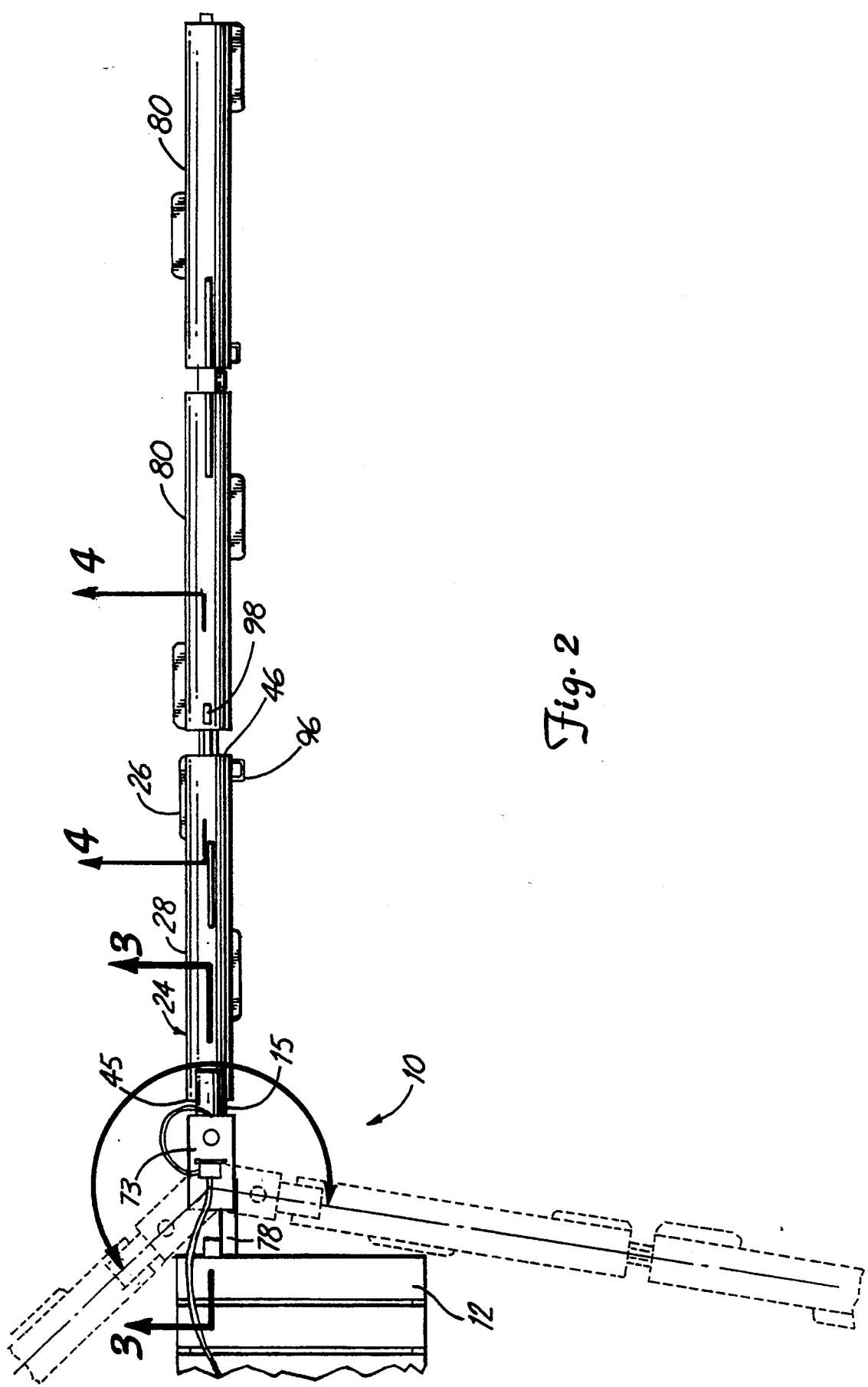

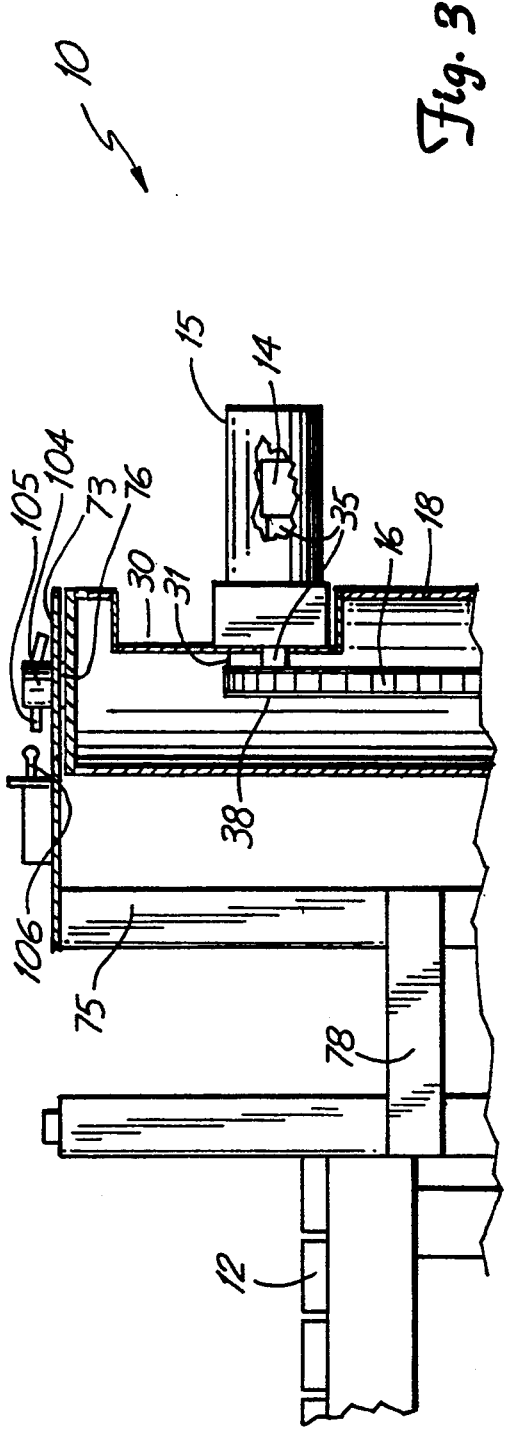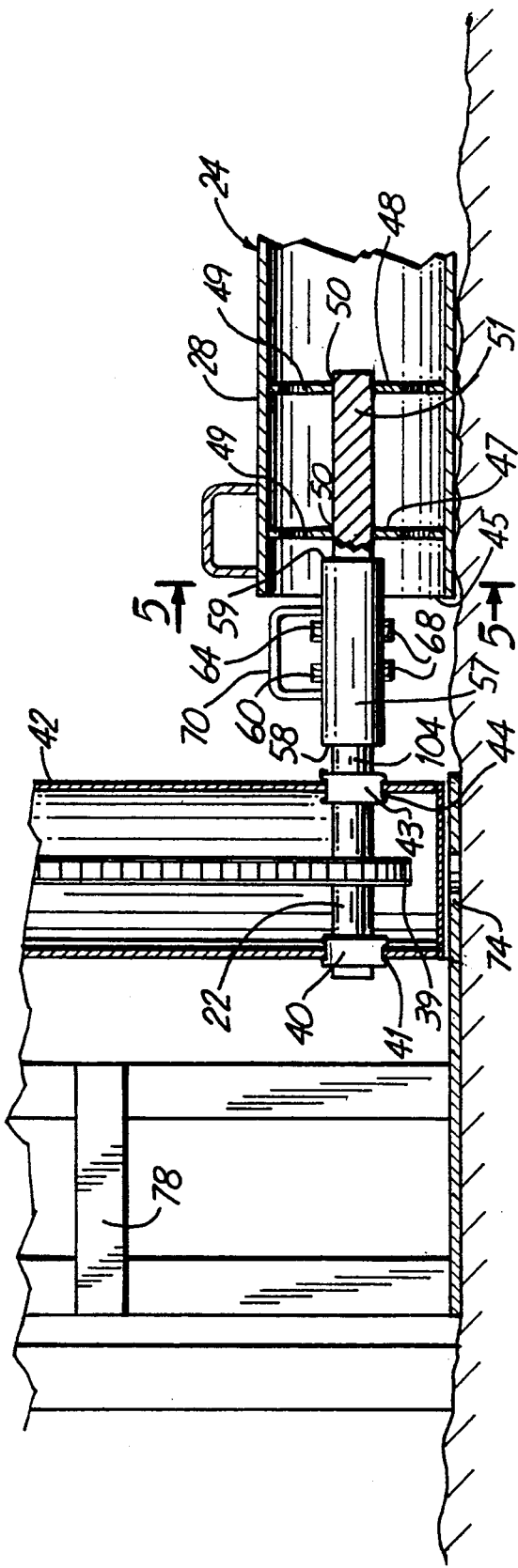

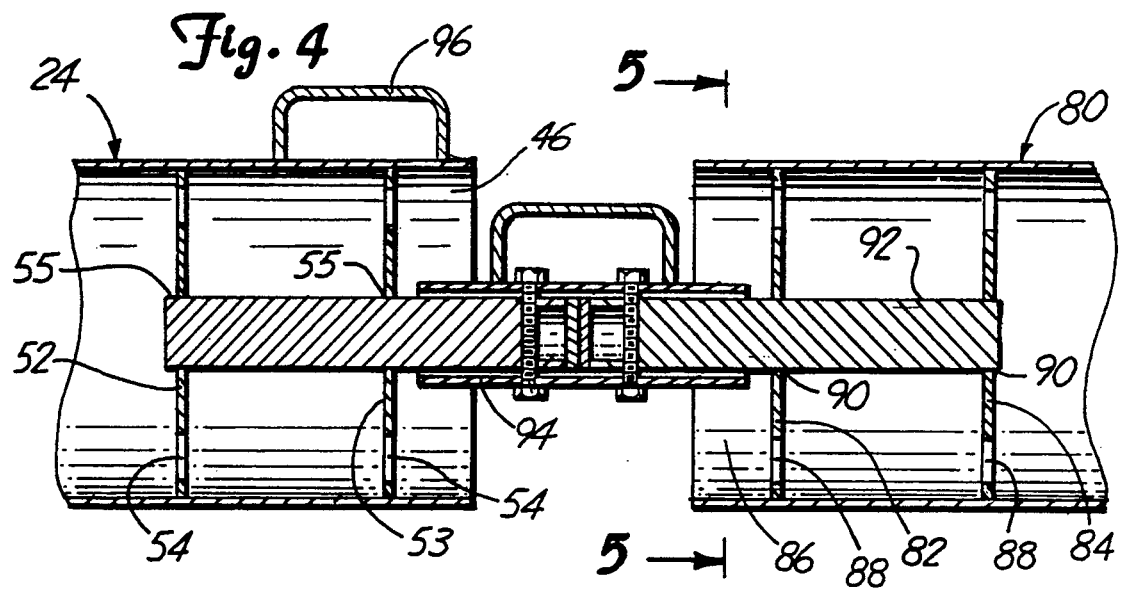
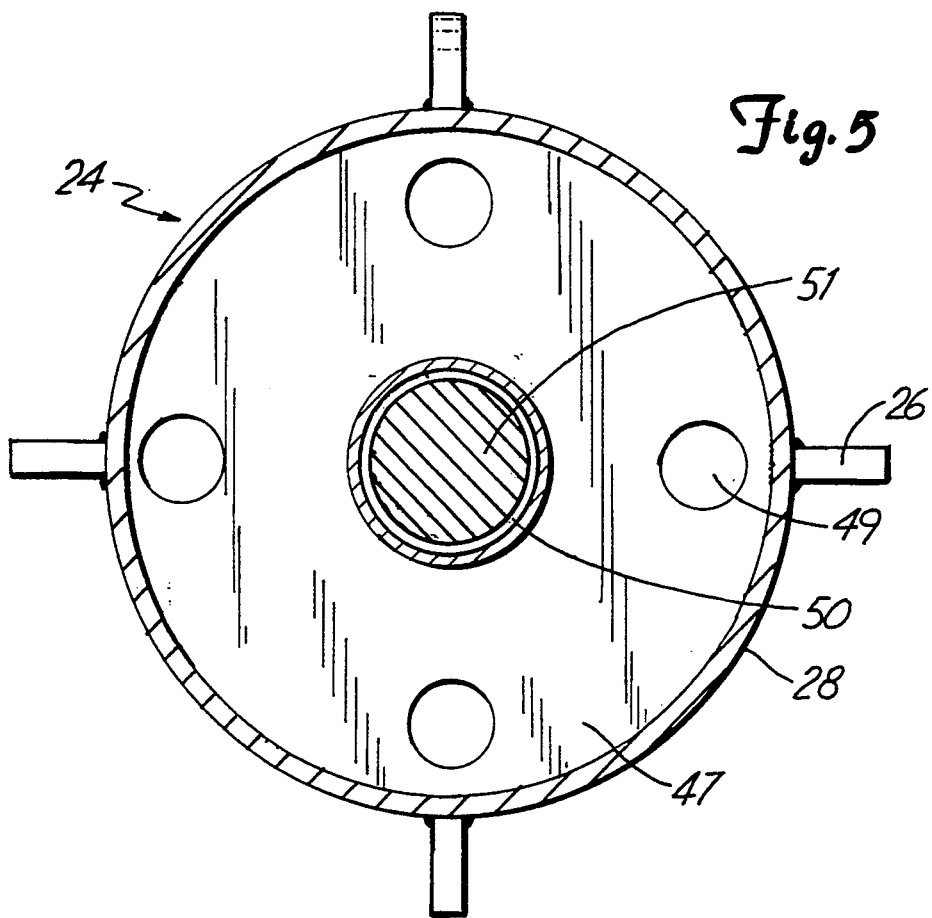

UNDERWATER WEED ROLLER

BACKGROUND OF THE INVENTION

The present invention relates to the removal of underwater plant life from the bed of a body of water. More specifically, the present invention relates to a weed remover that rolls on the bed of a body of water, removing existing underwater plant life and preventing the growth of new underwater plant life.

The rapid growth of underwater weeds continues to be a problem preventing the enjoyment of lakes, ponds, streams and other bodies of water. Underwater plant life, frequently rooted in the bed of a body of water, interferes with swimming, boating and other water-related activities.

Previous attempts to remove underwater plant life from the bed of a body of water have focused on cutting grown weeds with various cutting implements such as underwater rakes, chains, and other sharp devices. These devices attempt to cut or pull out the underwater weeds so that they can be removed and no longer interfere with water activities. See Farmer U.S. Pat. No. 3,133,395, Kriger U.S. Pat. No. 4,999,982 and Roth U.S. Pat. No. 5,074,105.

A problem with such cutting implements is that the focus is on cutting or uprooting the weeds rather than preventing their growth. After cutting the weeds, the weeds often grow back so that the process must be constantly repeated to insure a weed-free environment. In addition, the above-mentioned devices often require the use of manual labor to cut and remove the weeds.

There is therefore a need for a device which prevents underwater plant life from interfering with water activities but does not require the repeated use of manual labor. In addition, it would be useful if such a device were capable of removing and preventing the growth of underwater plant life from areas of various sizes.

SUMMARY OF THE INVENTION

The present invention provides an underwater weed remover which removes and prevents the growth of plant life on the bed of a body of water by reciprocating a roller over a portion of the bed. This provides a solution to the growth of underwater plant life that does not require the repeated manual cutting or uprooting of plants. The weed remover comprises a housing having a motor capable of driving a drive chain attached thereto. The drive chain is drivably attached to a roller which can have the general shape of a cylinder and has a plurality of fins attached to and extending outwardly from an outer surface. The housing can be attached to an upright support of a dock or other objects.

When the motor drives the drive chain, the roller rotates and the fins dig into the bed of the body of water to pull the roller, causing it to roll on the bed. As this happens, the housing pivots about a generally upright pivot axis causing the roller to move in an arc as it rolls. When the roller reaches a predetermined point, the motor will drive the drive chain in an opposite direction, causing the roller to roll on the bed in the opposition direction. The roller can therefore move back and forth in an arc. The rolling of the roller pulls existing weeds from the bed and the continued disturbance of the bed prevents new weeds from taking root and growing.

A second roller can be drivably coupled to the first mentioned roller to allow the weed remover to cover a larger area of the bed. An additional advantage of the weed remover of the present invention is that as the roller rolls over the bed of the body of water, it disturbs the dirt and silt which become separated from the bed and float away, leaving a sandy bed. Furthermore, the weed remover can be operated automatically at preselected times through the use of a timer.

The present invention thus provides an apparatus for effectively preventing the growth of plant life on the bed of a body of water without the need for repeated use of manual labor. The apparatus is environmentally safe and can cover areas having a variety of sizes.

BRIEF DESCRIPTION OF THE DRAWINGS

FIG. 2 is a top view of a dock having the weed remover of the present invention attached thereto;

FIG. 3 is a sectional view taken along the line 3—3 in FIG. 2;

FIG. 4 is a sectional view taken along the line 4—4 in FIG. 2;

FIG. 5 is a sectional view taken along the line 5—5 in FIG. 3;

DETAILED DESCRIPTION OF THE PREFERRED EMBODIMENTS

Figure 1:
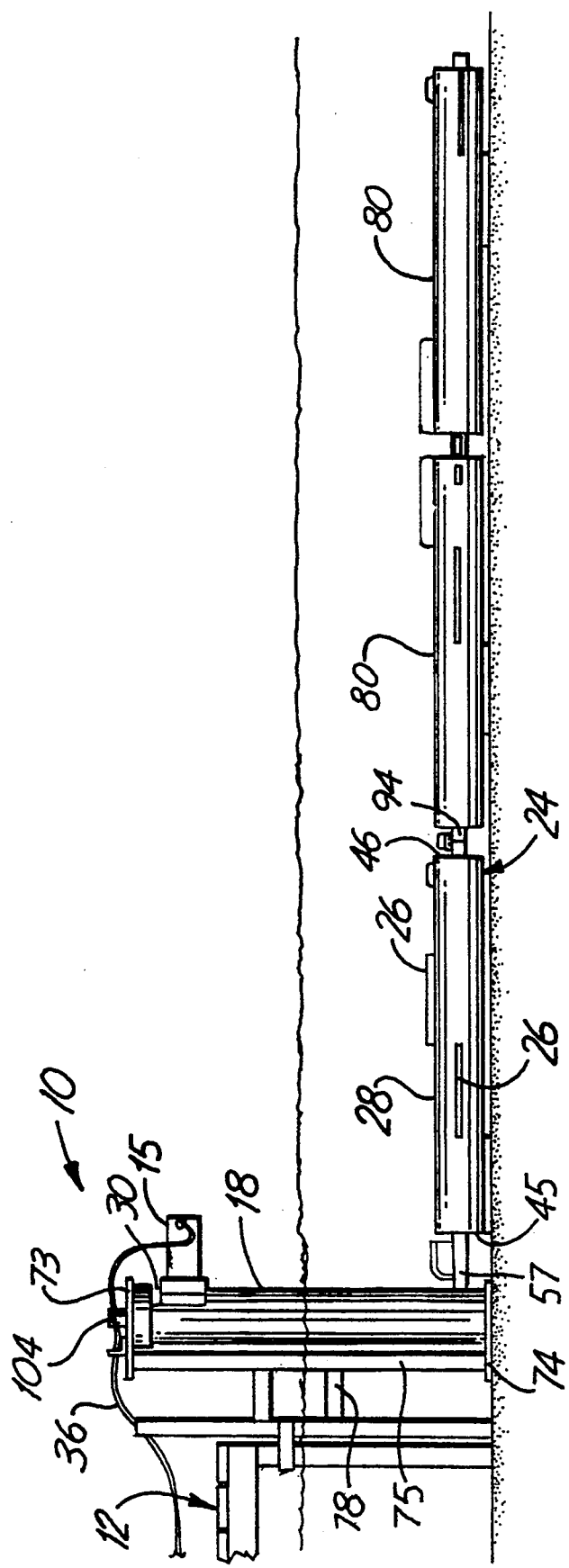
FIG. 1 is a side view of a dock having the weed remover of the present invention attached thereto.

The weed remover 10 of the present invention is shown attached to a dock 12 in a body of water in FIGS. 1 and 2. The weed remover 10, shown in more detail in FIG. 3, comprises a motor 14 contained in a motor housing 15 and drivably attached to a drive chain 16. The drive chain 16 extends through a main housing 18 and is drivably attached to a drive shaft 22. A roller 24 having a plurality of rectangular fins 26 attached to an outer cylindrical surface 28 thereof is drivably attached to one end of the shaft 22. When activated, the motor 14 drives the drive chain 16 which, through the drive shaft 22, rotates the roller 24.

The main housing 18 has the general shape of a hollow cylinder and has a recess 30 near an upper end. The motor housing 15 radially extends from the main housing 18 and is attached to the main housing 18 such that a first side 31 of the motor housing 15 rests in the recess 30. A motor shaft 35 extends from the motor 14, through openings in the main housing 18 and the first side 31 of the motor housing 15, and into the main housing 18. A power cable 36 extends from the motor housing 15 along the dock 12 and electrically connects the motor 14 to a power supply.

An upper sprocket 38 is drivably attached to the motor shaft 35 and engages the drive chain 16. The chain 16 extends along the length of the main housing 18 and is engaged by a lower sprocket 39 which is drivably attached to the drive shaft 22. A first shaft socket 40 is inserted into a first opening 41 in an outer cylindrical wall 42 of the main housing 18 and a second shaft socket 43 is inserted into a second opening 44 in the cylindrical wall 42 of the main housing 18. A first end of the drive shaft 22 is inserted into the first shaft socket 40 and the drive shaft 22 extends through the second shaft socket 43 and outside of the housing 18.

The roller 24 has the general shape of a hollow cylinder approximately ten feet long and six inches in diameter and is open at both a first end 45 and a second end 46. The fins 26 are radially spaced from each other as well as spaced along the length of the roller 24.

A first coupling disc 47 and a second coupling disc 48 are inserted in the roller 24 near the first end 45 and the first disc 47 is welded in place. Each coupling disc 47,48 has four holes 49 located around its periphery and a central hole 50 in its center. A first inner coupling rod 51 extends through the central holes 50 of the first and second coupling discs 47,48 and is welded therein. A third coupling disc 52 and a fourth coupling disc 53 are shown in FIG. 4. Each disc 52,53 has a plurality of holes 54 around its periphery and a central hole 55 through its center, and contacts an inner cylindrical surface of the roller 24 near the second end 46. A second inner coupling rod 56 extends through the central holes 55 of the third and fourth discs 52,53 and is welded therein. The fourth coupling disc 53 is welded to the inner cylindrical surface of the roller 24.

An outer coupling tube 57 having a circular cross-section and open at both a first end 58 and a second end 59 is slid over both the first inner coupling tube 51 and the drive shaft 22. A first bolt 60 extends through holes in the outer coupling tube 57 and in the drive shaft 22. A second bolt 64 extends through holes in the outer coupling tube 57 and in the first inner coupling rod 51. Both the first bolt 60 and the second bolt 64 are secured by nuts 68 to secure the drive shaft 22 to the first inner coupling rod 51. A handle 70 extends from the outer coupling tube 57 and disturbs the bed in the area between the housing 18 and the roller 24 as the roller 24 rotates.

The main housing 18 is held generally upright by a housing mounting assembly comprising a generally rectangular upper plate 73, a generally rectangular lower plate 74 and a housing support tube 75. The upper plate 73 is attached to a first end of the housing support tube 75 and the lower plate 74 is attached to a second end of the housing support tube 75 so that the upper plate 73 and the lower plate 74 are held parallel to each other. The main housing 18 extends between the upper plate 73 and the lower plate 74 and has a pivot post 76 extending from each end. The posts 76 extend through openings in the upper and lower plates 73,74, permitting the housing 18 to rotate about a generally upright axis. The mounting assembly is attached to the dock 12 through the use of two supports 78 which are attached to the housing support tube 75 and extend toward and attach to the dock 12. The supports 78 may be telescoping and can be held in place with a clamp. If mounted at the corner of the dock 12, the roller 24 can pivot 270° about its upright axis.

If desired, one or more additional rollers 80 may be drivably attached to the roller 24 to increase the area covered by the weed remover 10. The additional roller 80, shown in detail in FIG. 4, has a size and construction similar to the roller 24. A first coupling disc 82 and a second coupling disc 84 are mounted in a first end 86 of the additional roller 80 and the first coupling disc 82 is welded to an inner cylindrical surface of the additional roller 80. Each coupling disc 82,84 has a plurality of holes 88 around its periphery and a central hole 90 through its center. A coupling rod 92 extends through the first and second coupling discs 82,84 and is welded therein.

The additional roller 80 is attached to the second end 46 of the roller 24 by a second outer coupling tube 94, shown in FIG. 4, in a manner similar to the way in which the outer coupling tube 57 is used to attach the roller 24 to the drive shaft 22. The second outer coupling tube 94 has substantially the same construction as the outer coupling tube 57. A handle 96 is mounted on the exterior of the roller 24 at the second end 46 and a second handle 98 is mounted on the exterior of the additional roller 80 at the first end 86. The handles 96,98 are aligned with holes in the second inner coupling rod 56 and coupling rod 92 respectively so that they can be easily aligned with holes in the second outer coupling tube 94, allowing bolts to be easily inserted therethrough.

When the motor 14 is activated, the motor shaft 35 drives the drive chain 16 which rotates the drive shaft 22. The drive shaft 22 rotates the roller 24. Under normal operating conditions, the roller 24 rotates at the rate of approximately four revolutions per minute. When the roller 24 is rotated, the fins 26 dig into the bed of the body of water, pulling the roller 24 in the direction of rotation. This pulling force, coupled with the ability of the main housing 18 to rotate about its vertical axis, permits the roller 24 to roll on the bed in an arc. As the roller 24 rolls along the bed, it removes existing weeds and stirs up sand and silt, preventing the growth of new weeds. In addition, the silt disturbed by the roller 24 will drift away in the current of the water resulting in a weed-free, sandy bed.

A post 104, having two flexible strips 105 extending therefrom, extends from a top side of the upper plate 73. A toggle switch 106, which is electrically connected to the motor 14, is mounted on the upper plate 73. As the main housing 18 rotates, the post 104 rotates and a first of the flexible strips 105 will come into contact with and flip the switch 106. When this occurs, the switch 106 will reverse the direction in which the motor 14 rotates the motor shaft 35. The roller 24 will then rotate and move in an opposite direction until a second of the flexible strips 105 comes into contact with and flips the switch 106 which will again reverse the direction in which the motor 14 rotates the motor shaft 35. The roller 24 will therefore reciprocate over substantially the same path. The flexible strips 105 flex when they come into contact with the switch 106 so that they flip the switch 106 only after sufficient energy has been stored in them quickly flip the switch 106. This prevents a short from occurring during the flipping of the switch 106. The positions of the flexible strips 105 can be adjusted so that the roller 24 reciprocates in an arc having a desired size.

Figure 6:
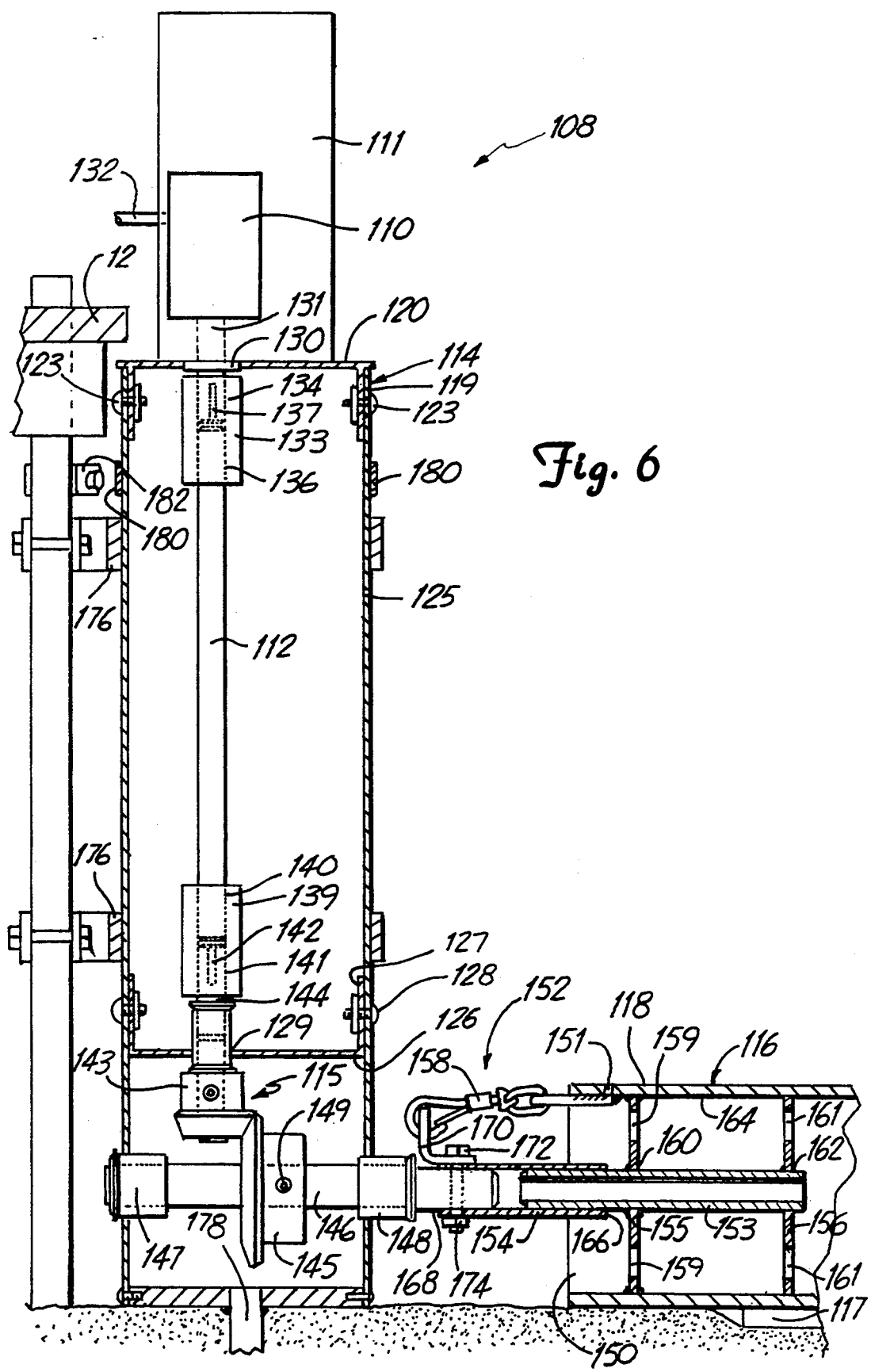
FIG. 6 is a sectional view of a dock having a modified form of the weed remover attached thereto.

In a first alternative embodiment of the present invention, shown in FIG. 6, a weed remover comprises a motor 110 contained in a motor housing 111 and drivably attached to a drive shaft 112. The drive shaft 112 extends through a drive housing 114 and is drivably attached to a gear assembly 115. A roller 116 having a plurality of rectangular fins 117 attached to an outer cylindrical surface 118 thereof is drivably attached to the gear assembly 115. The motor 310 is capable of rotating the drive shaft 112 which, through the gear assembly 115, can rotate the roller 116.

The drive housing 114 has the general shape of a hollow cylinder and is open at an upper end 119. An upper end cap 120 is inserted into the upper end 119 of the drive housing 114 and is held in place by a plurality of bolts 123, each of which is inserted through a hole in the upper end cap 120 and a corresponding hole in a cylindrical wall 125 of the drive housing 114. A circular plate 126 having a generally cylindrical plate support 127 attached thereto is contained in the drive housing 114 and held in place by a plurality of bolts 128 each of which is inserted through a hole in the plate support 127 and into a corresponding hole in the drive housing 114. The second plate 126 has a generally circular opening 129 therein.

The motor housing 111 is attached to the drive housing 114 such that the motor housing 111 rests on the upper end cap 120. A first shaft collar 130 is inserted through an opening in the motor housing 111 and through an opening in the upper end cap 120. The motor 110 has a motor shaft 131 which extends vertically from the motor 110 through the first shaft collar 130 and into the drive housing 114. A power cable 132 extends from the motor housing 111 and electrically connects the motor 110 to a power supply.

A first shaft connector 133 has the general shape of a cylinder and has a first bore 134 in an upper end and a second bore 136 in a lower end. The first bore 134 has a cross section having the general shape of a circle and has a slot 137 therein, while the second bore 136 has a cross section having the general shape of a hexagon. The motor shaft 131 is inserted into the first bore 134 such that a key protruding from the shaft 131 at an end furthest from the motor 110 fits into the slot 137. A first end of the drive shaft 112 is inserted into the second bore 136 and the drive shaft 112, which has a cross section having the general shape of a hexagon, extends vertically through the drive housing 114 spaced from the cylindrical wall 125.

A second shaft connector 139 has the same general shape as the first shaft connector 133 and has a first bore 140 in an upper end and a second bore 141 in a lower end. The first bore 140 has a cross section having the general shape of a hexagon and the second bore 141 has a cross section having the general shape of a circle and has a slot 142 therein. A second end of the drive shaft 112 is inserted into the first bore 140 of the second shaft connector 139.

The gear assembly 115 comprises a first pinion gear 143, a first gear shaft 144, a second ring gear 145 as shown having a diameter greater than that of the pinion gear 143 for speed reduction, and a second gear shaft 146. The pinion gear 143 is capable of rotating about a generally vertical axis while the ring gear 145 is capable of rotating about a generally horizontal axis. A plurality of teeth on the pinion gear 143 engage a plurality of teeth on the ring gear 145. The first gear shaft 144 has a key protruding therefrom at a first end and is inserted into the second bore 141 of the second shaft connector 139 such that the key fits into the slot 142. An opposite end of the first gear shaft 144 is inserted through a hole in the pinion gear 143.

A first shaft socket 147 having the general shape of a hollow cylinder is inserted into an opening in the cylindrical wall 125 of the drive housing 114 so that an open end of the first shaft socket 147 faces the ring gear 145. A second shaft socket 148 is inserted into a second opening in the cylindrical wall 125 so that a first open end of the second shaft socket 148 also faces the ring gear 145. A first end of the second gear shaft 146 is inserted into the first shaft socket 147 and the second gear shaft 146 extends through a hole in the ring gear 145 and through the second shaft socket 148. The second gear shaft 146 is secured to the ring gear 146 by a bolt 149 which extends through the ring gear 145 and the second gear shaft 146.

The roller 116 has the general shape of a hollow cylinder approximately ten feet long and six inches in diameter and is open at both a first end 150 and a second end. The fins 117 are radially spaced as well as spaced along the length of the roller 116. The roller 116 has a hole 151 in its cylindrical surface 118 near the first end 150.

The roller 116 is drivably attached to the gear assembly 115 by a roller coupling 152 comprising an inner coupling tube 153, an outer coupling tube 154, a first coupling plate 155, a second coupling plate 156 and a chain 158. Both the inner coupling tube 153 and the outer coupling tube 154 have a cross-section having the general shape of a rectangle. The first coupling plate 155 has the general shape of a hexagon with four circular holes 159 located around its periphery and a first rectangular hole 160 in its center. The second coupling plate 156 also has the general shape of a hexagon with four circular holes 161 around its periphery and a second rectangular hole 162 in its center.

Each corner of the first coupling plate 155 is welded to an inner cylindrical surface 164 of the roller 116 near the first end 150. The second coupling plate 156 is placed in the roller 116 so that it is parallel to the first coupling plate 155. The inner coupling tube 153 extends through both the first rectangular hole 160 and the second rectangular hole 162 and is welded to the first and second coupling plates 155,156. The outer coupling tube 154 is open at both a first end 166 and a second end 168 and has a cross-section large enough so that the inner coupling tube 153 can be slid into the first end 166. A bracket 170 is mounted on an outer surface of the outer coupling tube 154.

An end of the second gear shaft 146 furthest from the first shaft socket 147 is inserted into the second end 168 of the outer coupling tube 154 to a point where a bore in the second gear shaft 146 aligns with a pair of holes in the outer coupling tube 154. A bolt 172 extends through a hole in the bracket 170, the first of the holes in the outer coupling tube 154, the bore in the second gear shaft 146 and the second of the holes in the outer coupling tube 154. The bolt 172 is secured by a nut 174 to secure the second gear shaft 146 to the outer coupling tube 154. A first end of the chain 158 is attached to the roller 116 and a second end of the chain 158 is attached to the bracket 170 to secure the outer coupling tube 154 to the roller 116.

The drive housing 114 is attached to the dock 12 and is held generally upright by a pair of drive housing supports 176, each of which is clamped to the dock 12. Each drive housing support 176 has the general shape of a tube through which the drive housing 114 extends. The housing supports 176 are lubricated, permitting the drive housing 114 to rotate within the supports 176. A pivot 178 extends from a bottom end of the drive housing 114 into the bed of the body of water.

If desired, one or more additional rollers may be drivably attached to the roller 116 to increase the area covered by the weed remover 108. The additional roller is attached to a second end of the roller 116 by a second roller coupling similar to the roller coupling 152 used to attach the roller 116 to the second gear shaft 146.

When the motor 110 is activated, the motor shaft 131 rotates the drive shaft 112 which rotates the first gear shaft 144 and the pinion gear 143. The pinion gear 143 rotates the ring gear 145 and the second gear shaft 146 which rotates the roller 116. Under normal operating conditions, the roller 116 rotates at the rate of approximately four revolutions per minute.

A pair of blocks 180 extend from the outer cylindrical surface of the drive housing 114, and a toggle switch 182, which is electrically connected to the motor 110, is mounted on one of the drive housing supports 176. As the drive housing 114 rotates in the supports 176, a first of the blocks 180 will come into contact with the switch 182. When this occurs, the switch 182 will reverse the direction in which the motor 110 rotates the motor shaft 131. The roller 116 will then rotate and move in an opposite direction until a second of the blocks 180 comes into contact with the switch 182 which will again reverse the direction in which the motor 110 rotates the motor shaft 131. The roller 116 will therefore reciprocate over substantially the same path. The positions of the blocks 180 can be adjusted so that the roller 116 reciprocates in an arc having a desired size.

Figure 7:
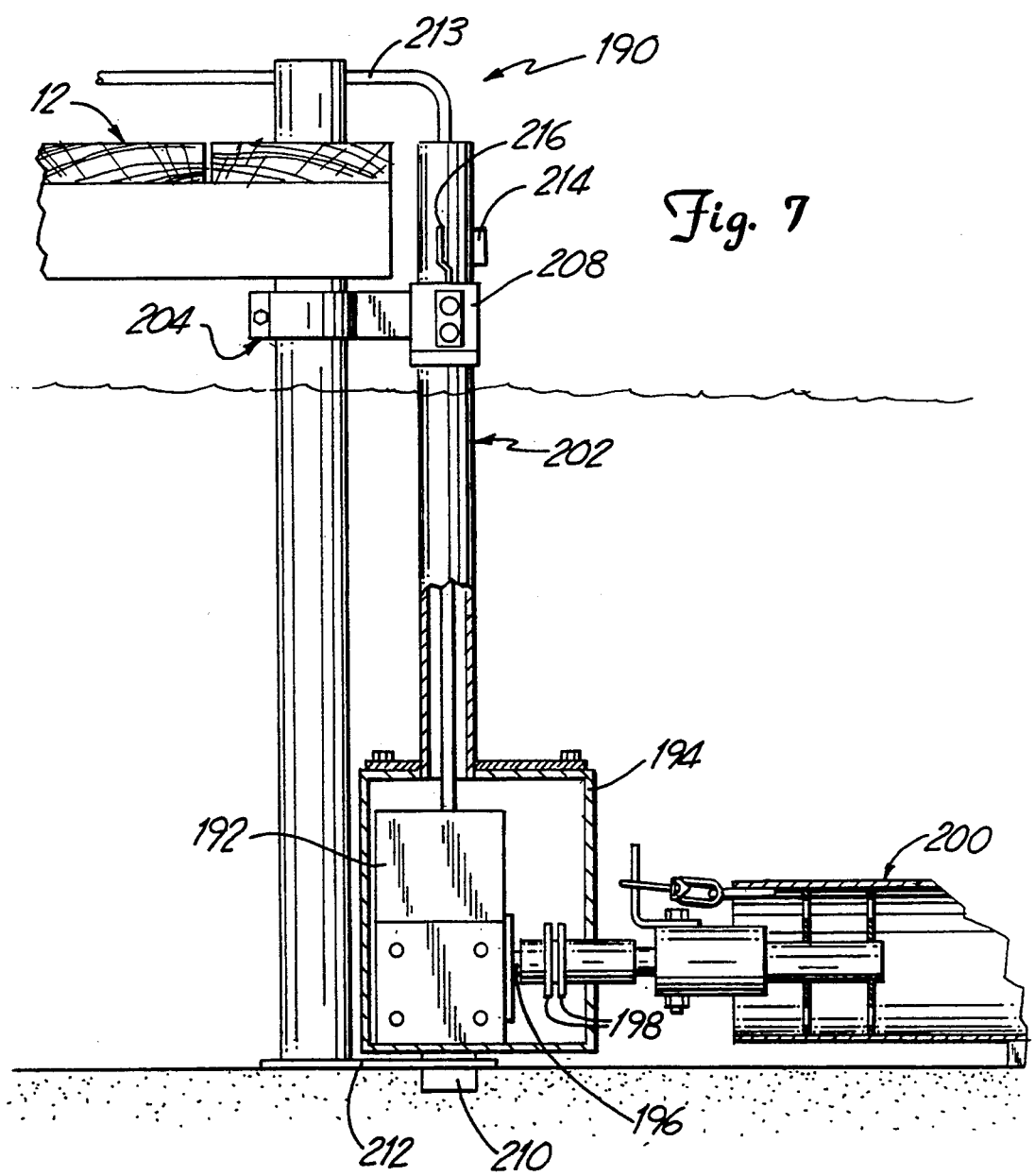
FIG. 7 is a side view of a dock having a modified form of the weed remover attached thereto.

In a second alternative embodiment of the present invention, shown in FIG. 7, a weed remover 190 comprises a motor 192 contained within a watertight motor housing 194 that rests on the bed of a body of water. The motor 192 has a motor shaft 196 that extends through an opening in the motor housing 194 sealed by two O-rings 198. A roller 200 similar to the roller 116 of the first alternative embodiment is drivably attached to an end of the motor shaft 196 furthest from the motor 192 in substantially the same manner that the roller 116 in the first alternative embodiment is attached to the second gear shaft 146.

A pivot tube 202 extends from a top side of the motor housing 194 to a point above the surface of the body of water and is attached to the dock 12 by a tube support 204. The tube support 204 has a collar 208 at one end through which the pivot tube 202 extends. The collar 208 is lubricated, allowing the pivot tube 202 to rotate within the collar 208. A pivot 210 extends from a bottom side of the motor housing 194 through a plate 212 and into the bed of the body of water. The motor 192 is electrically connected to a power supply by a power cable 213 which runs through the pivot tube 202 and along the dock 12.

When the motor 192 is activated, the motor shaft 194 rotates the roller 200 and the fins 117 dig into the bed, pulling the roller 200. The pivot tube 202 rotates in the collar 208 such that the roller 200 rolls in an arc in the same manner as described in the first alternative embodiment. As the pivot tube 202 pivots, a block 214 mounted on the pivot tube 202 will come into contact with a switch 216 mounted on the tube support 204, causing the motor 192 to reverse the direction in which it rotates the roller 200. The roller 200 will move in an arc in an opposite direction until a second block mounted on the pivot tube 202 contacts the switch 216, causing the motor 192 to again reverse the direction in which the roller 200 rotates.

When not being used, the weed remover 10 can be stopped at a position where it will not interfere with the use of the area over which the roller 24 rolls. In addition, the weed remover 10 of the present invention is capable of being activated through the use of a timer so that it can operate when the area is not being used.

Although the weed remover 10 of the present invention is described as being electrically powered, it can be powered by a gas engine, solar panels, waves or other methods. The roller 24 can be rotated by the motor 14 through the use of a belt in place of the drive chain 16 or the drive shaft 112 and gear assembly 115. In addition, the weed remover 10 can have a roller that rolls linearly either parallel or perpendicular to the shore. In such a variation of the weed remover 10, the roller could be placed on a track laid in the bed of the body of water and have a motor contained within it The roller 24 is described as a cylinder having a circular cross-section. However it can have a variety of cross-sectional shapes as well as a variety of sizes. In addition, there can be any number of fins 26 having a variety of sizes extending from the outer cylindrical surface 28 of the roller 24 in a variety of configurations. Further, the roller 24 can be designed so that it is extendable by nesting additional rollers within the roller 24. This would allow a single roller to cover areas having a variety of sizes and reduce the need for separately attached additional rollers 80. The roller 24 can be fabricated of a material such as aluminum to substantially eliminate rusting.

The switches used can be any of a variety of types including a slow throw switch in which the pivoting of the main housing 18 causes the switch to be slowly pushed until it reaches a threshold point where it is activated to reverse the direction of rotation of the motor 14. Finally, the chain 158 can be replaced by a spring or universal joint to couple the roller 116 to the second gear shaft 146 and to additional rollers.

Although the present invention has been described with reference to preferred embodiments, workers skilled in the art will recognize that changes may be made in form and detail without departing from the spirit and scope of the invention.

What is claimed is:

1. An apparatus for inhibiting the growth of plant life in a selected area on a bed of a body of water, the apparatus comprising:
    an elongated roller located in the body of water and being disposed substantially parallel to the bed, the roller having an outer surface contacting the bed;
    means secured to the bed and joined to the roller for guiding the roller as the roller rolls in the selected area; and
    means for rotating the roller so that the outer surface of the roller rolls on the bed as guided by the means for guiding in the selected area to disturb the bed in the selected area, the means for rotating including reciprocating means for reciprocating the roller over the selected area to inhibit the growth of plant life.

2. The apparatus according to claim 1 wherein the means for rotating comprises a motor mounted in a housing and having a drive chain coupled to the roller.

3. The apparatus according to claim 2 wherein the means for guiding includes pivot means for pivoting the housing about a generally upright pivot axis which is stationary relative to the bed of the body of water during at least a portion of the pivoting of the housing.

4. The apparatus according to claim 2 wherein a portion of the housing is located above a surface of the body of water.

5. The apparatus according to claim 4 including a shaft drivably attached to the drive chain so that the shaft can be rotated by the drive chain.

6. The apparatus according to claim 5 wherein a first end of the roller is drivably attached to the shaft so that the roller can be rotated by the shaft.

7. The apparatus according to claim 1 wherein the means for rotating comprises a motor mounted in a housing and having a drive shaft coupled to the roller.

8. The apparatus according to claim 7 wherein the housing is watertight.

9. The apparatus according to claim 8 wherein a first end of the roller is drivably attached to the drive shaft so that the roller can be rotated by the drive shaft.

10. The apparatus according to claim 8 and a tube extending from a side of the housing above a surface of the body of water containing wire means for electrically connecting the motor to a power source.

11. The apparatus according to claim 1 and a plurality of fins fixedly attached to the outer surface of the roller and extending outwardly therefrom.

12. The apparatus according to claim 1 wherein the roller comprises a hollow cylinder.

13. The apparatus according to claim 1 and a second roller axially aligned with the first mentioned roller and a coupling drivably attaching a first end of the second roller to a second end of the first mentioned roller.

14. The apparatus according to claim 2 wherein the motor is capable of rotating the drive chain in opposite directions, and switch means for reversing the direction in which the motor rotates the drive chain.

15. The apparatus according to claim 1 and timing means to automatically operate the rotating means at preselected times.

* * * * *